May 8, 1962
J. BLUE ETAL
3,033,301
AGRICULTURAL SPRAYING VEHICLE
Filed May 11, 1959
2 Sheets-Sheet 1
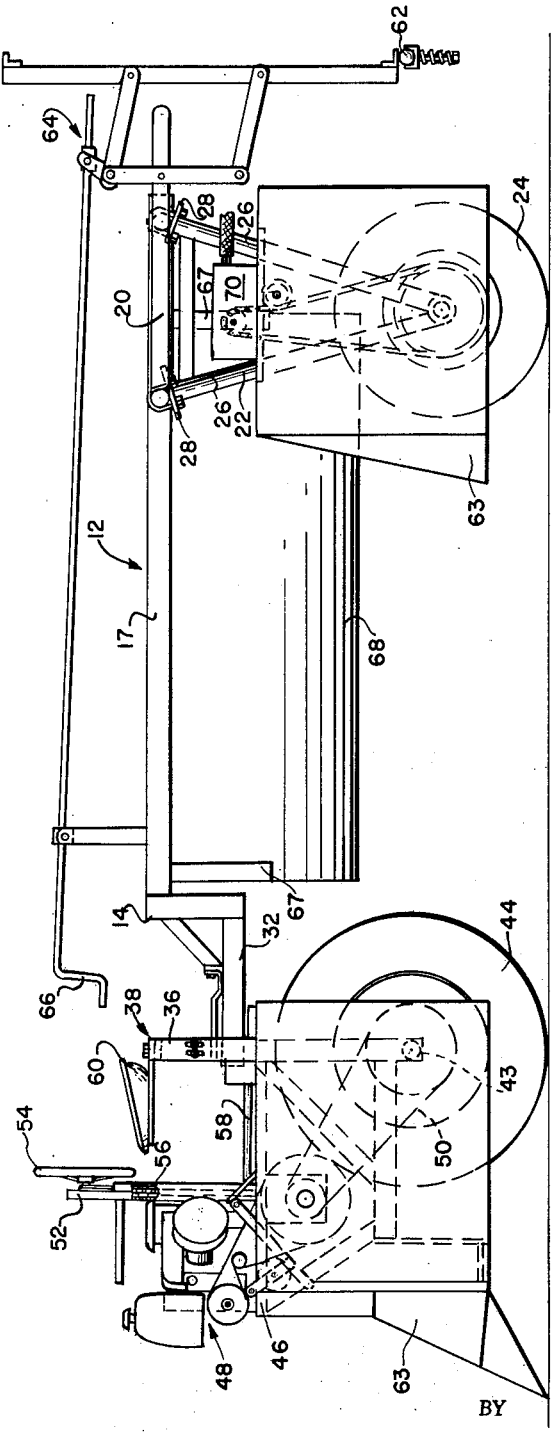
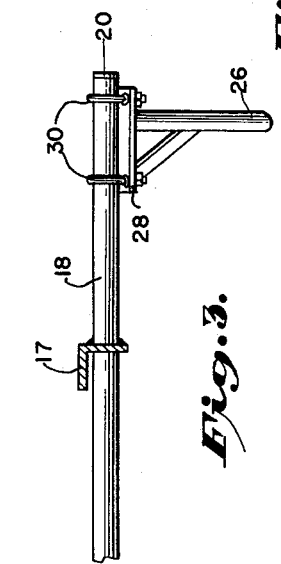
INVENTOR
JOHN BLUE
LAWRENCE N. TANGEMAN
BY Cushman, Darby & Cushman
ATTORNEYS

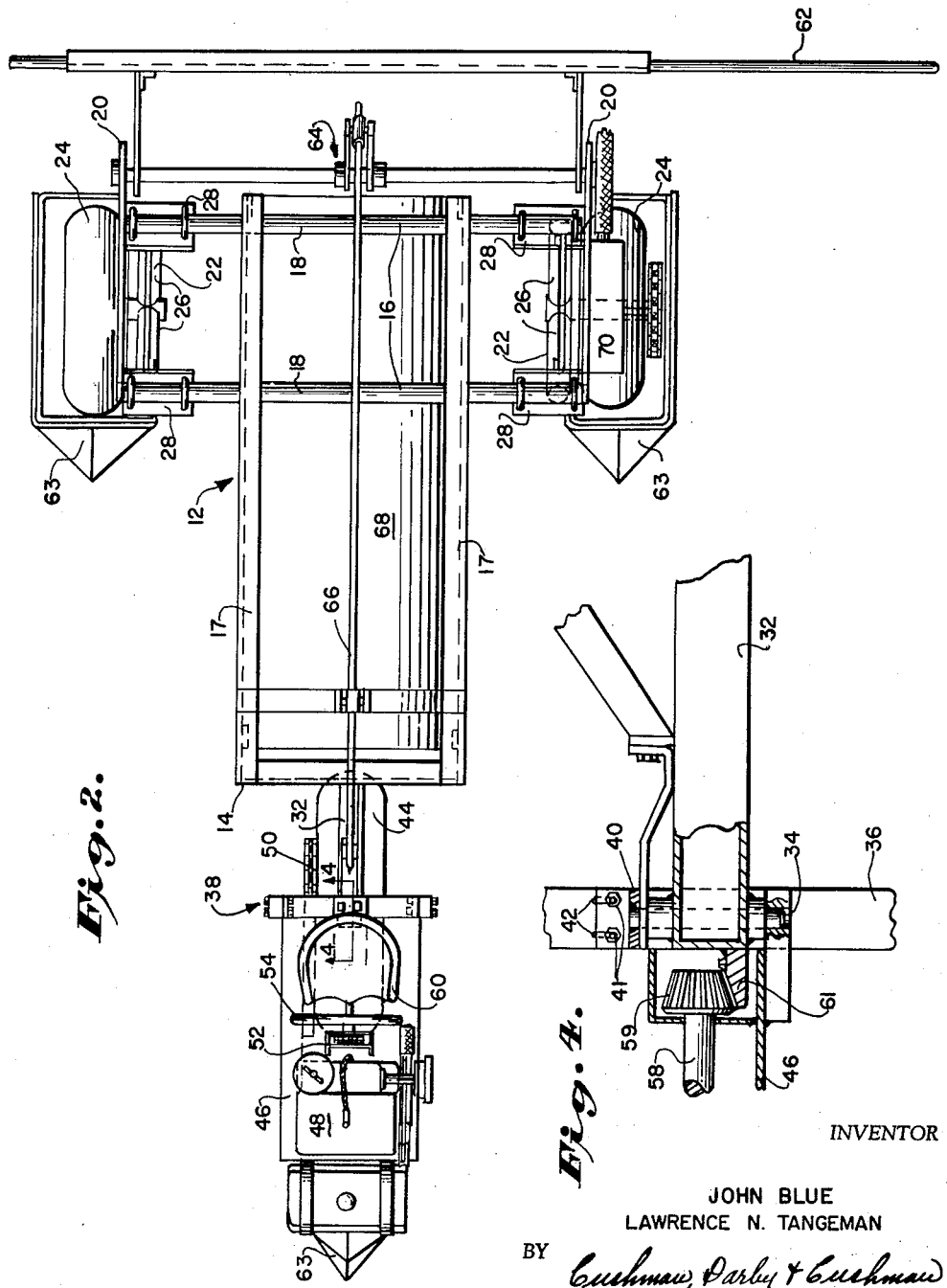

3,033,301
AGRICULTURAL SPRAYING VEHICLE

John Blue and Lawrence N. Tangeman, Huntsville, Ala., assignors to John Blue Company, Incorporated, Huntsville, Ala., a corporation of Alabama
Filed May 11, 1959, Ser. No. 812,445
3 Claims. (Cl. 180—26)

This invention relates to improvements in agricultural vehicles, and more particularly to an improved high-clearance self-propelled vehicle of the three-wheel type for use in the treatment of agricultural row crops such as cotton, corn, or tobacco. While the treatment referred to may be defoliating, fertilizing, flame cultivating, or the like, the vehicle of this invention is especially adapted for spraying or dusting crops with insecticides, fungicides, or the like, and will be so described.

It is an object of this invention to provide a vehicle of the type described which can be operated with both greater safety and convenience than similar vehicles heretofore employed.

A related object is to provide a driver's and operator's station upon a front steering fork of such a vehicle, thus imparting greater stability thereto while placing the operator in convenient proximity to the vehicle controls but distant from annoying and possibly injurious insecticides or dust.

Another object resides in the provision of a vehicle possessing exceptional torsional strength, to prevent flexing or torsional deflection, while having a frame of only ordinary size and weight.

A still further object is to provide for improved adjustment of the spacing between the rear wheels of such a vehicle, to compensate for crop rows of different widths, so that the adjustment can be completed with minimum time and effort.

Still other objects and advantages will in part be evident and in part pointed out hereinafter in the following detailed description of a preferred embodiment of the invention which should be read in conjunction with the accompanying drawings in which:

FIGURE 1 is a side view of a vehicle embodying this invention with parts broken away to show the construction more clearly;

FIGURE 2 is a plan view of the vehicle shown in FIGURE 1;

FIGURE 3 is an enlarged fragmentary front view of the rear wheel support adjusting means;

FIGURE 4 is an enlarged fragmentary sectional view, taken substantially along the line 4—4 in FIGURE 2, showing a part of the pivotal connection and steering mechanism between the frame and steering fork; and FIGURE 5 is an enlarged fragmentary front view of the pivotal connection and steering mechanism shown in FIGURE 4 with parts broken away to more clearly show the pivot pin adjusting means.

Referring more specifically to the drawings, the vehicle shown in FIGURES 1 and 2 includes a main frame member 12, generally T-shaped in plan view and having a longitudinally extending stem portion 14 and a transverse bar portion 16 integral therewith. Stem 14 is formed from a pair of parallel channel pieces 17, connected and reinforced along their length by straps welded therebetween. Bar 16 comprises a pair of tubular members 18 which are held in fixed parallel relation by stem 14 and also by straps 20 secured to their outer ends.

On both sides of the vehicle between stem 14 and straps 20 are substantially upright wheel supports 22 each having a stub axle at its lower ends upon which a wheel 24 is rotatably mounted. As best seen in FIGURE 3, each of the legs 26 of the supports 24 is provided at its upper end with a plate 28, which may be secured by U-bolts 30 to the corresponding tubular member 18. In vehicles of this type it is extremely desirable that the spacing between rear wheels be variable, to compensate for crop rows of different width. For obvious reasons, this adjustment should be as easy to secure as possible. In the instant invention spacing adjustment can be made with speed and facility, even under field conditions, by simply loosening the nuts holding U-bolts 30 in place, sliding supports 22 to the desired position on bar 16, and tightening the nuts once again. Between the limits imposed by stem 14 and straps 20, it will be noted that this arrangement provides for an infinite number of adjusting positions, to provide exactly for any desired spacing between rows. While highly effective, the arrangement also is quite inexpensive, due to its simplicity and lack of necessity for mating, accurately-machined elements.

All of the wheels of the vehicle are partially enclosed in fenders or shield-like pants 63, which are smoothly tapered toward their forward ends so as to gently part the foliage or crops which they contact. One or more sides of these fenders may be hinged, so as to present ready access to the wheel and mechanism enclosed therein when desired.

As seen in FIGURE 1, the forward end of stem 14 is vertically offset, the offset portion constituting a tongue 32 which is connected for pivotal movement in a generally horizontal plane to a pivot pin 34 (see FIGURES 4 and 5) mounted between the upstanding legs 36 of a steering fork 38. The mounting of pin 34 may include a plate 40, best seen in FIGURE 5, which is secured between legs 36 by bolts 41 extending through slots 42 therein, and capable by virtue of this arrangement of vertical adjustment. The upper end of pin 34 may be attached to this plate, as by welding, so that any wear in the pivot bearings in tongue 32, or in the pin itself, can be compensated for from time to time by vertically adjusting the position of the same simply by loosening bolts 41 and effecting the necessary movement of plate 40. Longer usage thus can be obtained from the pivot pin and/or its bearings before replacement becomes necessary.

Secured between the lower ends of legs 36 is an axle 43 rotatably carrying a large high-traction wheel 44. Mounted on the legs 36 above wheel 44 and extending forwardly thereof is a platform 46. Upon the forwardmost part of this platform is a motor 48 together with suitable auxiliary clutch and gear shift mechanisms, by which wheel 44 is driven through a chain 50 connected to a sprocket affixed thereto.

Extending upwardly from platform 46 is a column 52 having at its upper end a steering wheel 54. Manual steering of the vehicle is accomplished by actuating a chain 56 (FIGURE 1) connected to the steering wheel shaft, which in turn actuates a horizontal shaft 58 through a suitable sprocket mounted thereon. At the rearward end of shaft 58 is a bevel pinion 59 (see FIGURE 4) in mesh with a gear sector 61 secured to tongue 32, so that actuation of the pinion will pivot fork 38 relative to frame 12.

Also mounted upon fork 38 is an operator's seat 60. This location of the operator's seat is an important feature of the invention, inasmuch as several significant benefits stem therefrom. Of no small consequence is the increased convenience it affords the operator by placing him in convenient proximity and in fixed relation to steering wheel 54 and to the controls for motor 48. Also, it places him as far forward as possible from the annoying, and possibly hazardous spray emitted by the spraying apparatus of the vehicle, and in front of the dust generated by wheel 44.

Of more importance, however, is the increased stability imparted to the vehicle by locating the motor and seat upon fork 38 for pivotal movement therewith. It is well known that high-clearance vehicles of this general type are highly susceptible to overtipping on turns. This will occur whenever the momentum of the vehicle is sufficient to tip it about its outer rear and front wheels far enough that a vertical line drawn through its center of gravity will fall outside a line connecting said outside rear and front wheels. Overturning tendencies are decreased, therefore, by having the center of gravity of the vehicle shift away from this tipping line during turning, which is what is accomplished in the instant invention. As fork 38 is pivoted to the right for a turn, motor 48 and the operator also move to the right relative to frame 12, shifting the center of gravity of the vehicle to the right, away from the tipping line. Similarly, in a left turn, the center of gravity would shift to the left, decreasing any tendency of the vehicle to tip outwardly or to the right in this instance.

Apart from the foregoing, forward placement of the operator and motor tends to decrease overtipping tendencies of the vehicle by placing the center of gravity of the assembly mounted upon fork 38 well forward of pin 34, so that during turning the centrifugal force exerted upon the assembly resists the operator's turning effort. Consequently, the operator will have to reduce his speed in order to turn easily, and by so doing will decrease the likelihood of overtipping.

When utilized for spraying operations, the vehicle may include a spraying unit or bar 62. This may conveniently be secured to straps 20 at the rear of the vehicle by a mechanism 64, which can be actuated by means of lever 66 to raise or lower the spraying unit for crops of different heights. Spraying solution may be conducted to unit 62 by a pump (not shown) driven by the engine 48. When utilized for distributing liquid fertilizers, such may be conducted to the unit 62 by a metering pump 70 mounted upon a wheel support 22 and driven with suitable connections, e.g., a chain and sprocket arrangement, by wheel 24.

Rigidly suspended by straps 67 between channels 17 is a longitudinally extending metallic reservoir or supply tank 68, which customarily contains the liquid to be sprayed or distributed, in which event it would be connected by piping (not shown) to pump 70. This location of tank 68 is deemed highly significant inasmuch as torsional loads originating in the frame of the vehicle are transmitted to the tank and absorbed or dissipated entirely. Greater torsional strength is thus imparted to the vehicle, without the necessity of increasing the frame size, and consequently the weight, thereof.

Although the invention has been illustrated and described in connection with a preferred embodiment thereof, it is to be understood that it is not to be limited to such embodiment since changes and modifications can be made therein which are within the full intended scope of the invention as defined by the following claims.

What is claimed is:

1. A vehicle comprising: a horizontal substantially T-shaped frame having a stem portion and a cross bar portion; a steering fork; a single traction wheel rotatably mounted between the legs of said fork; pivot means connecting said fork to the end of said stem portion for steering movements about a substantially vertical axis which substantially intersects the rotational axis of said wheel; a motor drivingly connected to said wheel; steering means for pivoting said fork about said vertical axis; an operator's seat, said motor, steering means, and operator's seat being all mounted on said fork for pivotal movement therewith, said motor and steering means being mounted forward of said vertical axis; a pair of substantially upright wheel supports secured to and depending from the ends of said cross bar portion; and a ground-engaging supporting wheel rotatably secured to the lower end of each of said wheel supports.

2. The structure defined in claim 1 wherein the pivot means includes an upright pivot pin, bearing means engaging said pin, and means mounting said bearing means on said fork for vertical adjustment on the latter.

3. The structure defined in claim 1 in which the operator's seat is forward of the vertical axis.

References Cited in the file of this patent

UNITED STATES PATENTS

| 725,284 | Perkins | Apr. 14, 1903 |
| 1,877,126 | Greer | Sept. 13, 1932 |
| 1,992,065 | Grainger | Feb. 19, 1935 |
| 2,239,442 | Gredell | Apr. 28, 1941 |
| 2,368,202 | Clark | Jan. 30, 1945 |
| 2,457,821 | Johnson | Jan. 4, 1949 |
| 2,531,041 | Henry | Nov. 21, 1950 |
| 2,554,556 | Bobard | May 29, 1951 |
| 2,680,338 | Space | June 8, 1954 |
| 2,822,216 | Finley et al. | Feb. 4, 1958 |
| 2,843,992 | Jones | July 22, 1958 |
| 2,957,534 | Burdett | Oct. 25, 1960 |

FOREIGN PATENTS

| 596,210 | Great Britain | Dec. 30, 1947 |